(12) United States Patent
Na et al.

(10) Patent No.: US 11,031,184 B2
(45) Date of Patent: Jun. 8, 2021

(54) CAPACITOR COMPONENT INCLUDING EXTERNAL ELECTRODE HAVING EXTENDED PATTERN AND CONNECTION PATTERN EXTENDING FROM EXTENDED PATTERN

(71) Applicant: SAMSUNG ELECTRO-MECHANICS CO., LTD., Suwon-si (KR)

(72) Inventors: Do Heung Na, Suwon-si (KR); Min Gon Lee, Suwon-si (KR); Jin Kyung Joo, Suwon-si (KR); Byeong Chan Kwon, Suwon-si (KR); Taek Jung Lee, Suwon-si (KR); Jin Man Jung, Suwon-si (KR); Jae Yeol Choi, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

(21) Appl. No.: 16/430,950

(22) Filed: Jun. 4, 2019

(65) Prior Publication Data

US 2020/0075249 A1    Mar. 5, 2020

(30) Foreign Application Priority Data

Aug. 29, 2018  (KR) .................. 10-2018-0101835

(51) Int. Cl.
*H01G 4/232*  (2006.01)
*H01G 4/30*   (2006.01)
(Continued)

(52) U.S. Cl.
CPC .............. *H01G 4/232* (2013.01); *H01G 2/065* (2013.01); *H01G 4/30* (2013.01); *H01G 4/0085* (2013.01); *H01G 4/012* (2013.01); *H01G 4/1227* (2013.01)

(58) Field of Classification Search
CPC ........ H01G 4/232; H01G 4/2325; H01G 4/30; H01G 4/012; H01G 2/065
See application file for complete search history.

(56) References Cited

U.S. PATENT DOCUMENTS

2004/0190218 A1*  9/2004  Li ............................ H01G 4/30
                                                    361/302
2006/0126264 A1*  6/2006  Yoshii ..................... H01G 4/30
                                                    361/301.1
(Continued)

FOREIGN PATENT DOCUMENTS

JP            06026240 A   *  2/1994  ............... H01G 4/12
JP       2001-313230 A      11/2001
(Continued)

*Primary Examiner* — David M Sinclair
(74) *Attorney, Agent, or Firm* — Morgan, Lewis & Bockius LLP

(57) ABSTRACT

A capacitor component includes: a body including first and second internal electrodes alternately disposed in a first direction; first and second connection electrodes extending in the first direction in the body, respectively connected to the first and second internal electrodes, and opposing each other in a second direction; and first and second external electrodes disposed on one surface of the body and respectively connected to the first and second connection electrodes and each include an extended pattern disposed at one end portion on the one surface in the second direction and extending in a third direction, and a connection pattern extending, in the second direction, from a region spaced apart from both ends of the extended pattern in the third direction and connected to one of the first and second (Continued)

connection electrodes in a region spaced apart from opposite ends of the extended pattern in the third direction.

16 Claims, 4 Drawing Sheets

(51) Int. Cl.
*H01G 2/06* (2006.01)
*H01G 4/012* (2006.01)
*H01G 4/12* (2006.01)
*H01G 4/008* (2006.01)

(56) References Cited

U.S. PATENT DOCUMENTS

| | | | |
|---|---|---|---|
| 2012/0018204 A1* | 1/2012 | Sato | H01G 4/232 |
| | | | 174/260 |
| 2014/0104750 A1* | 4/2014 | Ahn | H01G 4/12 |
| | | | 361/306.3 |
| 2015/0016013 A1 | 1/2015 | Park et al. | |
| 2015/0124371 A1 | 5/2015 | Park et al. | |
| 2016/0211074 A1* | 7/2016 | Gu | H01G 4/012 |
| 2017/0323726 A1* | 11/2017 | Sasaki | H01G 4/005 |
| 2019/0096583 A1* | 3/2019 | Sasaki | H01G 4/232 |
| 2019/0326061 A1* | 10/2019 | Tomizawa | H01G 4/005 |

FOREIGN PATENT DOCUMENTS

| | | | | |
|---|---|---|---|---|
| JP | 4748317 B2 | | 3/2008 | |
| JP | 2014138172 A | * | 7/2014 | |
| JP | 2014187289 A | * | 10/2014 | |
| JP | 2017168521 A | * | 9/2017 | |
| JP | 2017216268 A | * | 12/2017 | ............... H01G 4/12 |
| KR | 10-2015-0007595 A | | 1/2015 | |
| KR | 10-2015-0052510 A | | 5/2015 | |

* cited by examiner

CAPACITOR COMPONENT INCLUDING EXTERNAL ELECTRODE HAVING EXTENDED PATTERN AND CONNECTION PATTERN EXTENDING FROM EXTENDED PATTERN

CROSS-REFERENCE TO RELATED APPLICATION(S)

This application claims benefit of priority to Korean Patent Application No. 10-2018-0101835 filed on Aug. 29, 2018 in the Korean Intellectual Property Office, the disclosure of which is incorporated herein by reference in its entirety.

TECHNICAL FIELD

The present disclosure relates to a capacitor component.

BACKGROUND

A multilayer ceramic capacitor (MLCC), a capacitor component, is a chip type capacitor mounted the printed circuit boards of various electronic products including display devices such as a liquid crystal display (LCD) and a plasma display panel (PDP), a computer, a smartphone and a mobile phone, serving to charge or discharge electricity.

The multilayer ceramic capacitor (MLCC) has advantages of small size, high capacitance and ease of mounting, and may thus be used as a component of various electronic devices. Accordingly, the MLCC has recently been developed to have high capacitance and high reliability.

In order to realize a capacitor having high capacitance, there is a method of increasing the number of stacked layers by improving a dielectric constant of a material constituting a capacitor body or by reducing thicknesses of dielectric layers and internal electrodes. However, it is not easy to develop a material composition having such a high dielectric constant and there is a limitation in reducing the thickness of the dielectric layer using an existing method. Therefore, there is a limitation in increasing capacitance of a product using the above method.

In this regard, under development is a multilayer ceramic capacitor in which a via or through-hole is formed, a via electrode is formed by filling the via or through-hole with a conductive material, and a lower electrode is formed to be connected to the via electrode.

SUMMARY

An aspect of the present disclosure may provide a multilayer ceramic capacitor which may prevent a short-circuit between external electrodes while having a high capacitance and a low equivalent series inductance (ESL).

According to an aspect of the present disclosure, a capacitor component may include: a body including dielectric layers and first and second internal electrodes alternately disposed in a first direction with one of the dielectric layers interposed therebetween; first and second connection electrodes extending in the first direction in the body, respectively connected to the first and second internal electrodes, and opposing each other in a second direction, perpendicular to the first direction; and first and second external electrodes disposed on one surface of the body and respectively connected to the first and second connection electrodes, wherein the first external electrode includes a first extended pattern disposed at one end portion on the one surface of the body in the second direction and extending in a third direction, perpendicular to the first and second directions, and a first connection pattern extending, in the second direction, from a region spaced apart from both ends of the first extended pattern in the third direction to be connected to the first connection electrode in a region spaced apart from opposite ends of the first extended pattern in the third direction; and the second external electrode includes a second extended pattern disposed at the other end portion on the surface of the body in the second direction and extending in the third direction, and a second connection pattern extending, in the second direction, from a region spaced apart from both ends of the second extended pattern in the third direction to be connected to the second connection electrode in a region spaced apart from opposite ends of the second extended pattern in the third direction.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
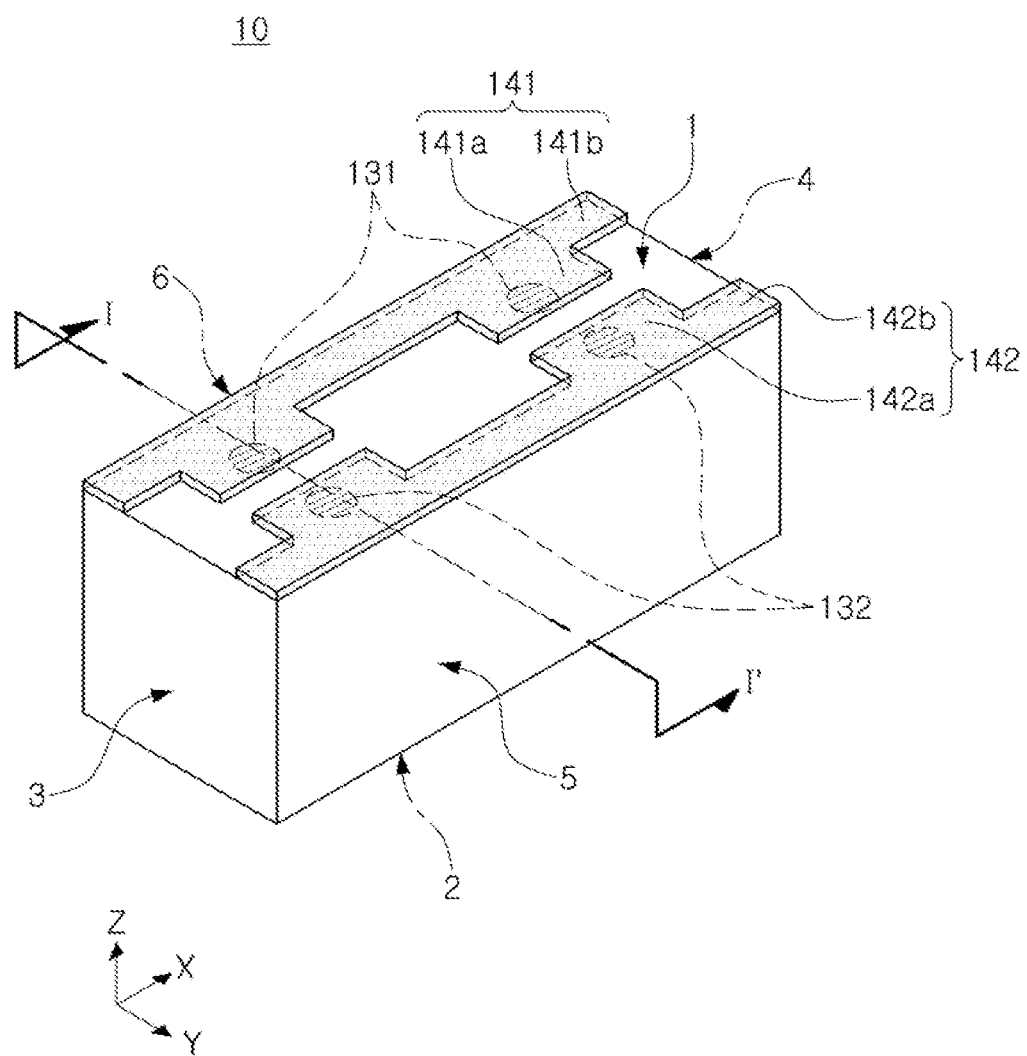
FIG. 1 schematically illustrates a perspective view of a capacitor component according to an embodiment in the present disclosure.

Hereinafter, exemplary embodiments of the present disclosure will now be described in detail with reference to the accompanying drawings.

In the drawing, an X direction may be defined as a third direction or a length direction, a Y direction as a second direction or a width direction, and a Z direction as a first direction, a thickness direction, or a layer stacking direction.

Figure 2:
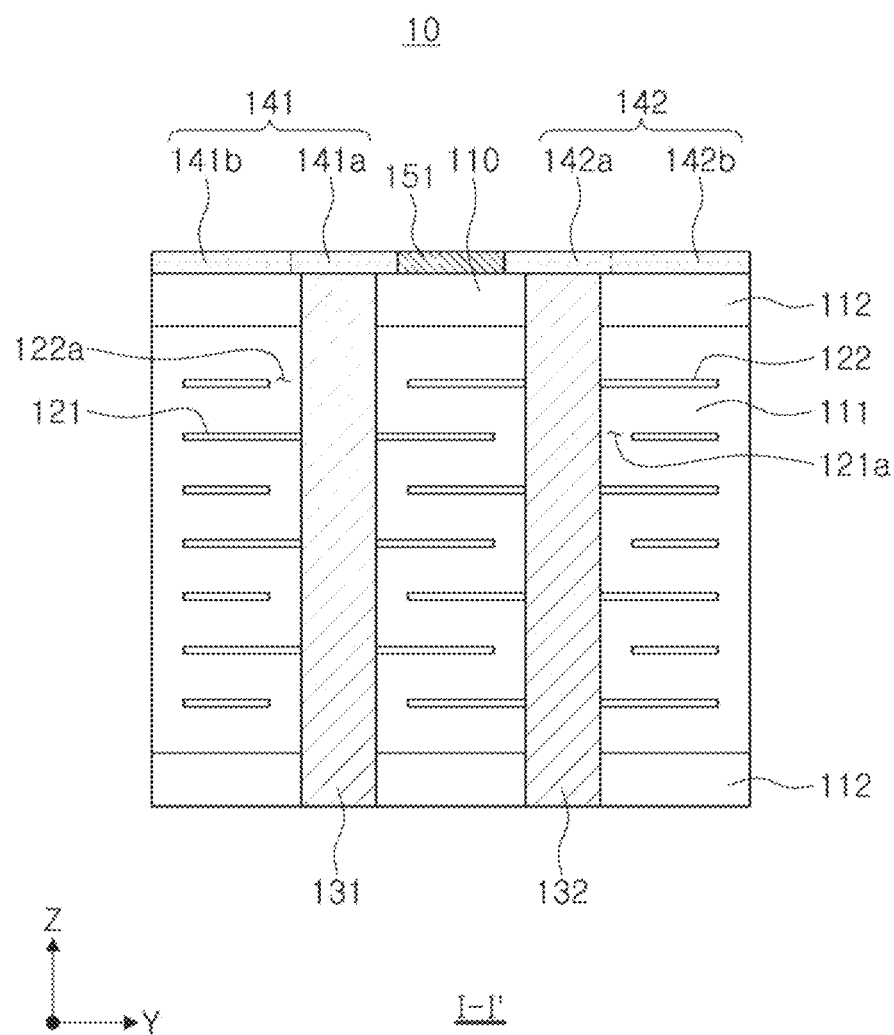
FIG. 2 schematically illustrates a cross-sectional view taken along line I-IS in FIG. 1.
Figure 3:
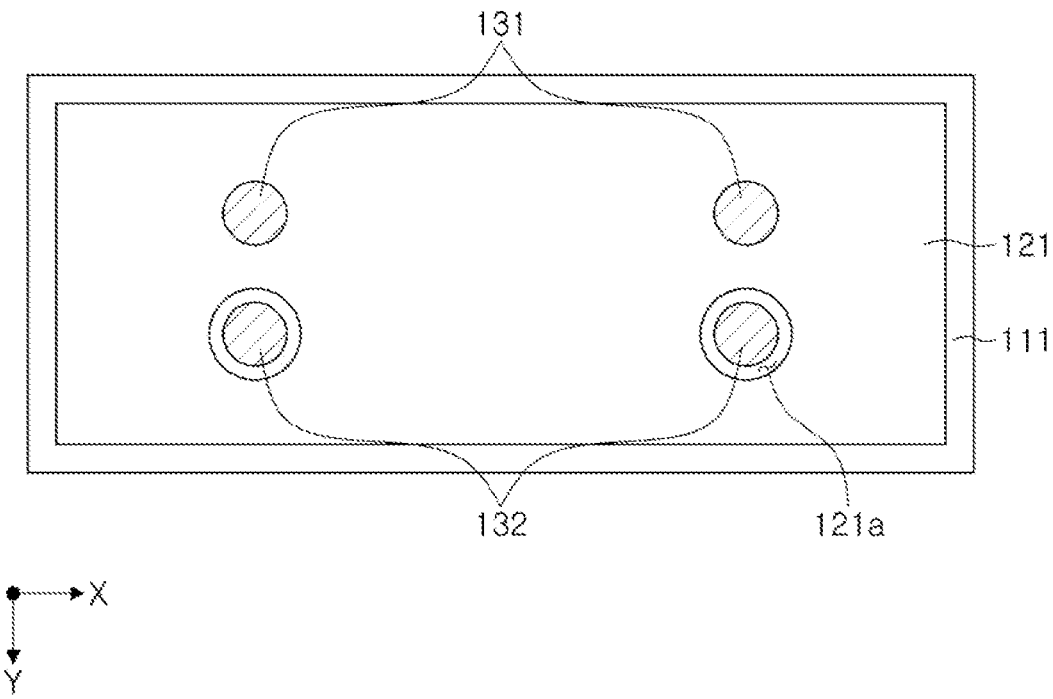
FIG. 3 is a cross-sectional view in width and length directions of the body for explaining a connection relationship between a first internal electrode and first and second connection electrodes.
Figure 4:
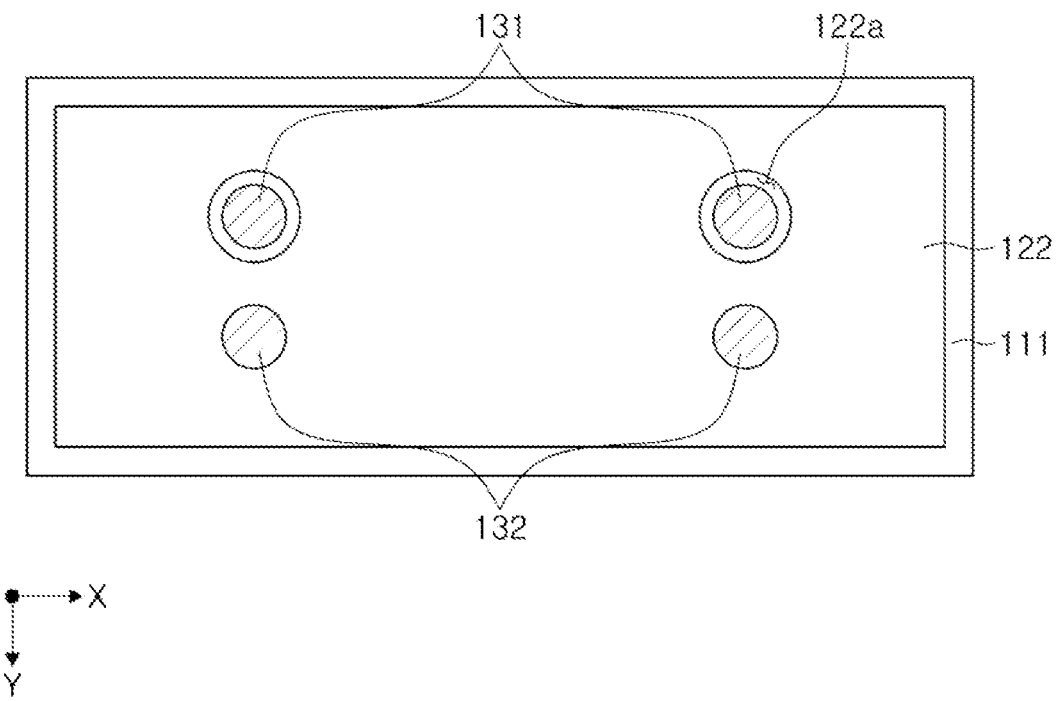
FIG. 4 is a cross-sectional view in width and length directions for explaining a connection relationship between a second internal electrode and the first and second connection electrodes.
Figure 5:
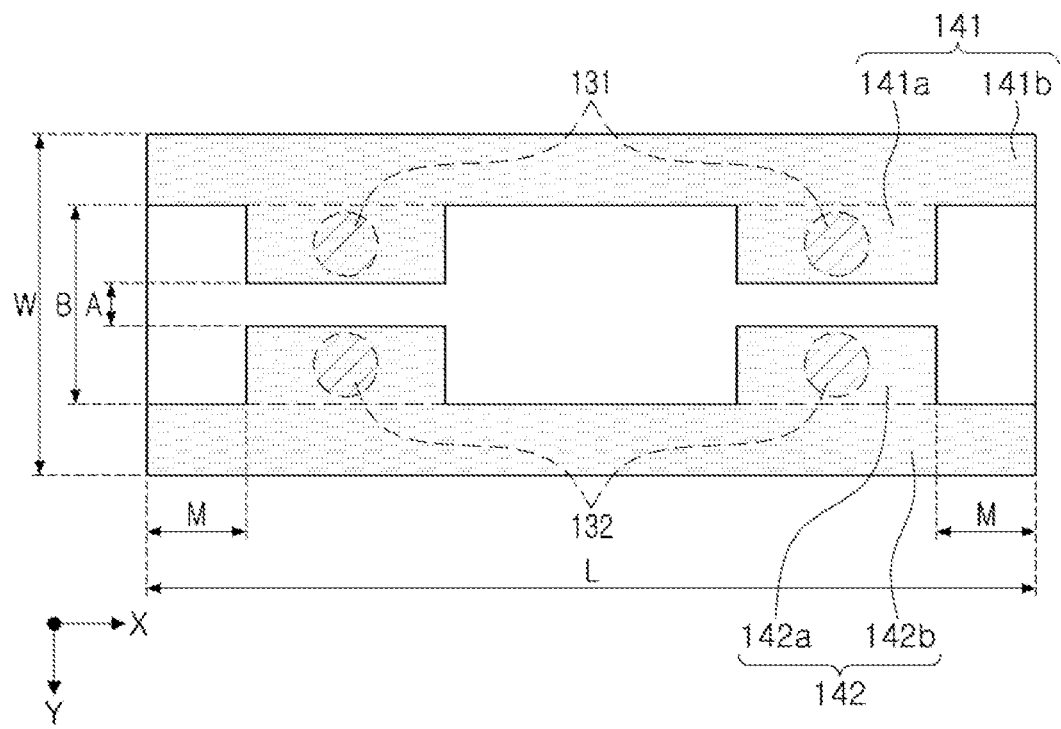
FIG. 5 is a view illustrating external electrodes of a capacitor component according to an embodiment in the present disclosure.

FIG. 1 schematically illustrates a perspective view of a capacitor component according to an embodiment in the present disclosure, FIG. 2 schematically illustrates a cross-sectional view taken along line I-IS in FIG. 1, FIG. 3 is a cross-sectional view in width and length directions of the body for explaining a connection relationship between a first internal electrode and first and second connection electrodes, FIG. 4 is a cross-sectional view in width and length directions for explaining a connection relationship between a second internal electrode and the first and second connection electrodes, and FIG. 5 is a view illustrating external electrodes of a capacitor component according to an embodiment in the present disclosure.

Referring to FIGS. 1 through 5, a constitution of a capacitor component 10 will be described according to an exemplary embodiment in the present disclosure.

A body of the capacitor component 10 according to an exemplary embodiment may include dielectric layers 111 and first and second internal electrodes 121 and 122 alternately disposed in a first direction (a Z direction) with each of the dielectric layers 111 interposed therebetween.

A body 110 may have a form in which a plurality of dielectric layers 111 are stacked, and may be obtained by stacking and then sintering a plurality of green sheets. By this sintering process, the plurality of dielectric layers 111 may have an integrated form. A Shape and size of the body 110 and the stacked number of the dielectric layers 111 are not limited to those illustrated in the present embodiment. For example, as illustrated in FIG. 1, the shape of the body 110 may be a rectangular parallelepiped.

The body 110 may have first and second surfaces 1 and 2 opposing each other in the thickness direction (the Z direction), third and fourth surfaces 3 and 4 connected to the first and second surfaces 1 and 2 and opposing each other in the length direction (the X direction), and fifth and sixth surfaces 5 and 6 connected to the third and fourth surfaces 3 and 4 and opposing each other in the width direction (the Y direction).

Each of the dielectric layers 111 included in the body 110 may include a ceramic material having a high dielectric constant. For example, the ceramic material may include barium titanate ($BaTiO_3$) based or strontium titanate ($SrTiO_3$) based materials and another material known in the art as long as obtaining sufficient capacitance. The dielectric layers 111 may further include other materials such as an additive, an organic solvent, a plasticizer, a binder, a dispersing agent and the like when necessary together with the ceramic material as a main component, and may include the same material as that added to the internal electrodes 121 and 122 as an additive. Concentration of such an additive may be suitably adjusted locally in order to ensure a uniform sintering property.

The body 110 may be formed by stacking four or more layers of the dielectric layers 111. For example, the body 110 may be formed by stacking 400 to 500 layers of the dielectric layers 111.

On the upper and lower portions of the body 110, there may be disposed cover layers 112 which are formed by stacking dielectric layers including no internal electrode. The cover layers 112 may serve to maintain reliability of the capacitor component 10 against an external impact.

The body 110 may include the first and second internal electrodes 121 and 122 alternately disposed with each of dielectric layers 111 interposed therebetween.

The first and second internal electrodes 121 and 122 may have different polarities from each other when driven by being respectively connected to different external electrodes 141 and 142. The first and second internal electrodes 121 and 122 may be obtained by printing a paste which includes a conductive metal having a predetermined thickness on one surface of ceramic green sheets made of the dielectric layers and then sintering the paste. A main constituent material of the first and second internal electrodes 121 and 122 may be nickel (Ni), copper (Cu), palladium (Pd), silver (Ag) or the alloys thereof.

Here, the first and second internal electrodes 121 and 122 may respectively include first and second insulating portions 121a and 122a. The first and second insulating portions 121a and 122a may each refer to a region in which the first or second internal electrode 121 or 122 is not formed and respectively serve to connect the first and second internal electrodes 121 and 122 only to the external electrodes having different polarities. That is, as illustrated in FIGS. 3 and 4, a first connection electrode 131 may be spaced apart from the second internal electrode 122 by the second insulating portion 122a; and a second connection electrode 132 may be spaced apart from the first internal electrode 121 by the first insulating portion 121a. Spaces in the body 110 corresponding to the first insulating portion 121a and the second insulating portion 122a may be filled with a dielectric material of the ceramic green sheets through compressing and sintering processes to make the body 110.

The first and second internal electrodes 121 and 122 may be respectively connected to first and second external electrodes 141 and 142 by the first and second connection electrodes 131 and 132. Accordingly, there may be maximized a region in which the first and second internal electrodes 121 and 122 overlap each other with each of the dielectric layers interposed therebetween. As a result, capacitance of the capacitor component 10 may be significantly increased.

The body 110 may include the first and second connection electrodes 131 and 132 extending in the first direction (the Z direction) in the body to respectively be connected to the first and second internal electrodes 121 and 122, and disposed to oppose each other in the second direction (the Y direction) perpendicular to the first direction (the Z direction).

The first and second connection electrodes 131 and 132 may penetrate, in the thickness direction (Z direction), intermediate portions of the body 110 in the width direction (the Y direction). The intermediate portions may be spaced apart from each other and spaced apart from the third to sixth surfaces 3 to 6 of the body 110. The first and second connection electrodes 131 and 132 and a portion of the body 110 between the first and second connection electrodes 131 and 132 in the width direction (the Y direction) may be a central portion of the body 110 in the width direction (the Y direction).

As a frequency increases, an alternating current AC flows in the capacitor component 10 and an equivalent series inductance (ESL) is determined by a magnetic flux generated by the current. It is thus important to minimize a current path in order to minimize the ESL. In addition, a current signal has a tendency to form the shortest path with the smallest impedance when having a high frequency, so that an arrangement of the connection electrodes affects the ESL. Therefore, the first and second connection electrodes 131 and 132 may be disposed at the center portion of the body in the width direction (the Y direction) to shorten the current path, and thereby lowering the ESL.

The closer the first and second connection electrodes 131 and 132 are to each other, the shorter the current path may be. When a distance between the first connection electrode 131 and the second connection electrode 132 is too short, a short-circuit failure may occur due to a contact therebetween. The distance between the first connection electrode 131 and the second connection electrode 132 may thus be determined considering diameters of the first and second connection electrodes 131 and 132.

Further, the first and second connection electrodes 131 and 132 may be disposed to oppose each other in the width direction (the Y direction), such that a first extended pattern 141b of the first external electrode 141 and a second extended pattern 142b of the second external electrode 142 may be formed to be elongated in the length direction (the X direction) of the body as described below. Therefore, the body 110 may be prevented from being broken and adhesion between the capacitor component 10 and a board may be increased when the capacitor component 10 is mounted on the board.

Accordingly, the first and second extended patterns 141*b* and 142*b* may satisfy W<L to be formed to be elongated in the length direction (the X direction) when W is a length of the body in the second direction and L is a length of the body in the third direction. An element being elongated may mean that a length of the element in an elongated direction is greater than a length of the element in another direction perpendicular to the elongated direction.

Further, the first and second connection electrodes 131 and 132 may be spaced apart from opposite end surfaces 3 and 4 of the body in the length direction (the X direction) so that first and second connection patterns 141*a* and 142*a* are spaced apart from the opposite end surfaces 3 and 4 of the body 110 in the length direction (the X direction).

In a case where the first and second connection patterns 141*a* and 142*a* are not spaced apart from each other on the opposite end surfaces 3 and 4 of the body, a plating layer may be formed so that the first and second connection patterns 141*a* and 142*a* are connected to each other on the opposite end surfaces 3 and 4 in the length direction (the X direction) when performing plating and accordingly, a short-circuit may occur due to the plating layer.

The first and second connection electrodes 131 and 132 may be formed by filling vias passing through the body 110 with a conductive material, respectively. The first and second electrodes 131 and 132 may be formed by filling the vias with the conductive material by a method of applying a conductive paste or a plating method. A main constituent of the conductive material may be nickel (Ni), copper (Cu), palladium (Pd), silver (Ag) or the alloys thereof.

The first and second external electrodes 141 and 142 may be disposed on one surface of the body 110 and respectively connected to the first and second connection electrodes 131 and 132.

The first external electrode 141 may include the first extended pattern 141*b* disposed at one end portion on the one surface of the body 110 in the second direction (the Y direction) and extending in the third direction (the X direction), and the first connection pattern 141*a* extending in the second direction (the Y direction) from a region spaced apart from both ends of the first extended pattern in the third direction (the X direction) to be connected to the first connection electrode 131 in a region spaced apart from opposite ends of the first extended pattern in the third direction (the X direction).

The second external electrode 142 may include a second extended pattern 142*b* disposed on the other end of the surface of the body 110 in the second direction (the Y direction) and extending in the third direction (the X direction), and a second connection pattern 142*a* extending in the second direction (the Y direction) from a region spaced apart from both ends of the second extended pattern in the third direction (the X direction) to be connected to the second connection electrode 132 in a region spaced apart from opposite ends of the second extended pattern in the third direction (the X direction).

That is, the first and second external electrodes 141 and 142 may include the first and second connection patterns 141*a* and 142*a* respectively disposed on the first and second connection electrodes 131 and 132, and the first and second extended patterns 141*b* and 142*b* respectively connected to the first and second connection patterns 141*a* and 142*a* and respectively disposed at edges of the body in the width direction (the second direction).

The first and second connection patterns 141*a* and 142*a* may be respectively connected to the first and second connection electrodes 131 and 132 so that the first and second internal electrodes 121 and 122 are electrically connected to the first and second external electrodes 141 and 142, respectively.

The first and second connection patterns 141*a* and 142*a* may be formed spaced apart from each other on the opposite end surfaces 3 and 4 of the body 110 in the length direction (the X direction). This is because in a case where the first and second connection patterns 141*a* and 142*a* are not spaced apart from each other on the opposite end surfaces 3 and 4, a plating layer may be formed so that the first and second connection patterns 141*a* and 142*a* are connected to each other on the opposite end surfaces 3 and 4 in the length direction (the X direction) at the time of performing plating and accordingly, a short-circuit may occur due to the plating layer.

Here, when A is defined as a distance between the first and second connection patterns 141*a* and 142*a* disposed to oppose each other of the body 110 in the width direction (the Y direction), A may be set to such a degree as not to cause a short-circuit between the first and second connection patterns, and the degree is not particularly limited.

In addition, when M is defined as each of distances between the first and second connection patterns 141*a* and 142*a* and opposite ends of the body in the third direction (the X direction), M may be set to such a degree that a plating layer is formed so as not to be connected thereto by considering a kind of the plating layer or a material of the external electrodes, and the degree is not particularly limited.

The first extended pattern 141*b* may be disposed at one end portion on the one surface of the body 110 in the second direction (the Y direction) and extend in the third direction (the X direction).

The second extended pattern 142*b* may be disposed at the other end portion on the surface of the body 110 in the second direction (the Y direction) and extend in the third direction (the X direction).

When a distance B between the first and second extended patterns 141*b* and 142*b* is equal to a distance A between the first and second connection patterns, a plating layer may be formed so that the first and second extended patterns 141*b* and 142*b* are connected to each other on the opposite end surfaces 3 and 4 of the body in the width direction at the time of performing plating and accordingly, the short-circuit may occur due to the plating layer. In the present disclosure, the first and second extended patterns 141*b* and 142*b* may be disposed at the edges of the body in the width direction to prevent the short-circuit occurring due to the plating layer.

In addition, the first and second extended patterns 141*b* and 142*b* may prevent the body from being broken and serve to increase adhesion between the capacitor component 10 and a board when the capacitor component 10 is mounted on the board.

When the first and second extended patterns 141*b* and 142*b* do not exist, the body may be broken in a process for dicing the body into individual chips after printing the external electrodes on the body. In addition, the adhesion between the capacitor component and the board may not be sufficiently ensured only with the connection patterns 141*a* and 141*b*.

Here, the first and second extended patterns 141*b* and 142*b* may extend from one surface of the body 110 to the opposite ends of the body in the third direction, respectively, to more reliably prevent the body from being broken and to further improve the above-mentioned adhesion.

Further, when B is defined as a distance between the first and second extended patterns 141b and 142b, B may be set to such a degree that a plating layer is formed so as not to be connected thereto by considering a kind of the plating layer or a material of the external electrodes, and the degree is not particularly limited.

Meanwhile, the numbers of the first connection electrodes 131 and the first connection patterns 141a may be plural. The plurality of first connection electrodes 131 may be spaced apart from each other in the third direction (the X direction) and the plurality of first connection patterns 141a may be spaced apart from each other in the third direction (the X direction). The numbers of the second connection electrodes 132 and the second connection patterns 142a may be plural. The plurality of second connection electrodes 132 may be spaced apart from each other in the third direction (the X direction) and the plurality of second connection patterns 142a may be spaced apart from each other in the third direction (the X direction).

Electrical connection between the internal electrodes and the external electrodes may be further improved by including the plurality of the first connection electrodes 131, the second connection electrodes 132, the first connection patterns 141a and the second connection patterns 142a.

Meanwhile, the first and second external electrodes 141 and 142 may be disposed only on one surface of the body 110, i.e. a first surface 1 as illustrated in FIG. 1. Lower electrodes may refer to such electrodes as the above-described first and second external electrodes 141 and 142 disposed only on one surface of the body 110. Of course, the first and second external electrodes 141 and 142 may be additionally disposed on a second surface 2 opposing the first surface 1 of the body 110, and the present disclosure is not limited to such a disposition of the lower electrodes.

The first and second external electrodes 141 and 142 may not extend on either the opposite end surfaces 3 and 4 in the length direction or the opposite side surfaces 5 and 6 of the body in the width direction. In this case, the capacitor component 10 may decrease margins of the opposite end surfaces or those of the opposite side surfaces, which connect an upper surface and a lower surface of the body 110 to each other, and thus increase a region in which the first and second internal electrodes 121 and 122 are formed. As a result, the capacitance of the capacitor component 10 may be increased.

Here, the capacitor component 10 may further include an insulating layer 151 (shown only in FIG. 2) disposed between the first and second external electrodes 141 and 142 in order to more reliably prevent the short-circuit occurring between the external electrodes 141 and 142 at the center of the body in the length direction (the X direction).

However, even though the insulating layer 151 is formed, as described above, when the distance B between the first and second extended patterns is equal to the distance A between the first and second connection patterns, a plating layer may be formed so that the first and second extended patterns 141b and 142b are connected to each other on the opposite end surfaces 3 and 4 of the body in the width direction at the time of performing plating and accordingly, the short-circuit may occur due to the plating layer. It is to be noted that the insulating layer 151 is a constitution for more reliably preventing the short-circuit between the first and second external electrodes 141 and 142 at the center portion of the body in the width direction (the Y direction).

Meanwhile, the first and second external electrodes 141 and 142 may further include a plating layer disposed thereon.

For example, a nickel (Ni) plating layer or a tin (Sn) plating layer may be respectively formed on the first and second external electrodes, or the Ni plating layer and the Sn plating layer may be sequentially formed thereon.

Figure 6:
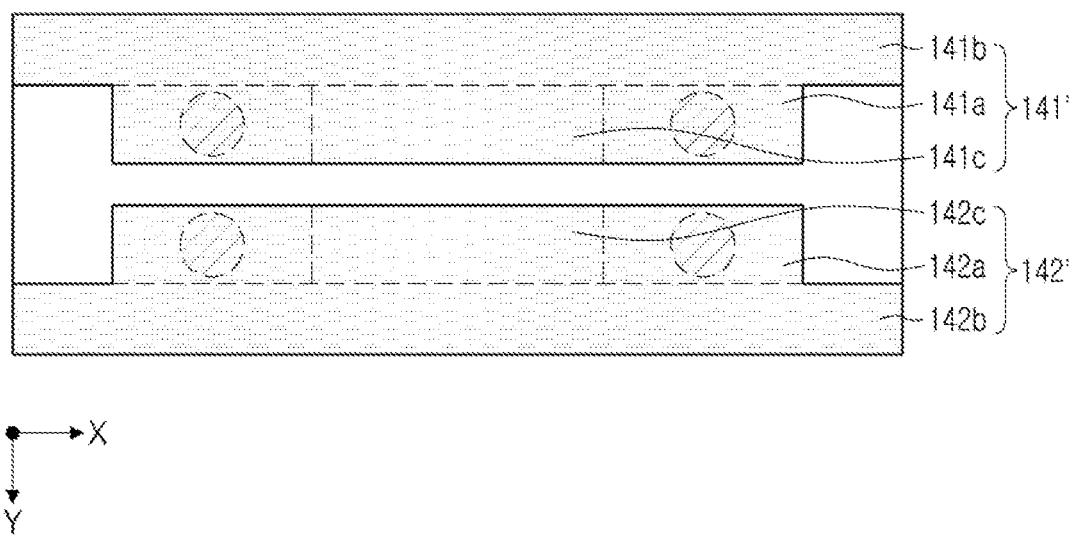
FIG. 6 is a view illustrating external electrodes of a capacitor component according to another embodiment in the present disclosure.

FIG. 6 is a view illustrating external electrodes 141' and 142' of a capacitor component according to another embodiment in the present disclosure. Hereinafter, a description for overlapping constitutions will be omitted.

The external electrodes 141' and 142' of a capacitor component according to another embodiment in the present disclosure may include first and second additional patterns 141c and 142c.

The numbers of the first connection electrodes 131 and the first connection patterns 141a may be plural, the plurality of first connection electrodes 131 may be spaced apart from each other in the third direction (the X direction) and the plurality of first connection patterns 141a may be spaced apart from each other in the third direction (the X direction); and the numbers of the second connection electrodes 132 and the second connection patterns 142a may be plural, the plurality of second connection electrodes 132 may be spaced apart from each other in the third direction (the X direction) and the plurality of second connection patterns 142a may be spaced apart from each other in the third direction (the X direction).

In addition, the first additional pattern 141c may be disposed in a space between the plurality of first connection patterns 141a spaced apart from each other and the second additional pattern 142c may be disposed in a space between the plurality of second connection patterns 142a spaced apart from each other.

The first and second additional patterns 141c and 142c may serve to improve the adhesion between the capacitor component 10 and the board when the capacitor component 10 is mounted on the board. In this case, the first additional pattern 141c and the plurality of first connection patterns 141a may be one integral element in the third direction (the X direction), and the second additional pattern 142c and the plurality of second connection patterns 142a may be one integral element in the third direction (the X direction).

As set forth above, according to an exemplary embodiment in the present disclosure, the capacitor component may have an effect of preventing the short-circuit between the external electrodes while having a high capacitance and a low equivalent series inductance (ESL).

The capacitor component also has an effect of improving strength of the edge of the body in the width direction and preventing the body from being broken by disposing the first and second extended patterns on the body thereof.

In addition, the first and second internal electrodes may be connected to the first and second external electrodes using the first and second connection electrodes, thereby increasing the region in which the first and second internal electrodes overlap each other in the stacking direction. As a result, the capacitance of the multilayer ceramic capacitor may be improved.

While exemplary embodiments have been shown and described above, it will be apparent to those skilled in the art that modifications and variations could be made without departing from the scope of the present invention as defined by the appended claims.

What is claimed is:

1. A capacitor component comprising:
a body including dielectric layers and first and second internal electrodes alternately disposed in a first direction of the body with one of the dielectric layers interposed therebetween;
first and second connection electrodes extending in the first direction in the body, respectively connected to the first and second internal electrodes, and opposing each other in a second direction of the body; and
first and second external electrodes disposed on one surface of the body and respectively connected to the first and second connection electrodes,
wherein the first external electrode includes a first extended pattern disposed at one end portion on the one surface of the body in the second direction and extending in a third direction of the body, and a first connection pattern extending, in the second direction, from a region spaced apart from both ends of the first extended pattern in the third direction to be connected to the first connection electrode in a region spaced apart from opposite ends of the first extended pattern in the third direction,
the second external electrode includes a second extended pattern disposed at the other end portion on the surface of the body in the second direction and extending in the third direction, and a second connection pattern extending, in the second direction, from a region spaced apart from both ends of the second extended pattern in the third direction to be connected to the second connection electrode in a region spaced apart from opposite ends of the second extended pattern in the third direction,
the first connection pattern includes first and second edges opposing each other in the third direction and completely spaced apart from both ends of the first extended pattern in the third direction, a third edge connecting the first and second edges to each other,
the second connection pattern includes fourth and fifth edges opposing each other in the third direction and completely spaced apart from both ends of the second extended pattern in the third direction, a sixth edge connecting the fourth and fifth to each other,
the third edge and the sixth edge face each other in the second direction,
the first connection electrodes and the first connection patterns are provided in plural, the plurality of first connection electrodes are spaced apart from each other in the third direction and the plurality of first connection patterns are spaced apart from each other in the third direction, and
the second connection electrodes and the plurality of second connection patterns are provided in plural, the plurality of second connection electrodes are spaced apart from each other in the third direction and the plurality of second connection patterns are spaced apart from each other in the third direction.

2. The capacitor component of claim 1, wherein W<L, where W is a length of the body in the second direction and L is a length of the body in the third direction.

3. The capacitor component of claim 1, wherein the first and second extended patterns extend on the one surface of the body to opposite ends of the body in the third direction.

4. The capacitor component of claim 1, wherein the first and second internal electrodes respectively include first and second insulating portions,
the first connection electrodes are spaced apart from the second internal electrode by the second insulating portion, and
the second connection electrodes are spaced apart from the first internal electrode by the first insulating portion.

5. The capacitor component of claim 1, wherein the first and second external electrodes are additionally disposed on a surface opposing the one surface of the body.

6. The capacitor component of claim 1, wherein the first and second external electrodes do not extend to either opposite end surfaces or opposite side surfaces of the body in the second direction.

7. The capacitor component of claim 1, wherein the first and second external electrodes are disposed only on the one surface of the body.

8. The capacitor component of claim 1, wherein the first and second external electrodes are disposed only on the one surface of the body and the other surface opposing the one surface of the body.

9. The capacitor component of claim 1, further comprising an insulating layer disposed between the first and second external electrodes.

10. The capacitor component of claim 1, wherein the first and second external electrodes further include a plating layer disposed thereon.

11. The capacitor component of claim 1, wherein the second direction is perpendicular to the first direction, and the third direction is perpendicular to the first and second directions.

12. A capacitor component comprising:
a body including dielectric layers and first and second internal electrodes alternately disposed in a first direction of the body with one of the dielectric layers interposed therebetween;
a plurality of first connection electrodes extending in the first direction in the body, connected to the first internal electrodes;
a plurality of second connection electrodes extending in the first direction in the body, connected to the second internal electrodes;
a first external electrode disposed on one surface of the body and connected to the plurality of first connection electrodes; and
a second external electrode disposed on the one surface of the body and connected to the plurality of second connection electrodes,
wherein the first external electrode includes a first extended pattern disposed at one end portion on the one surface of the body in a second direction and extending in a third direction of the body, and a plurality of first connection patterns respectively extending, in the second direction, from a region spaced apart from both ends of the first extended pattern in the third direction to respectively cover the plurality of first connection electrodes,
the second external electrode includes a second extended pattern disposed at the other end portion on the surface of the body in the second direction and extending in the third direction, and a plurality of second connection patterns respectively extending, in the second direction, from a region spaced apart from both ends of the second extended pattern in the third direction to respectively cover the plurality of second connections,
the plurality of first connection patterns are spaced apart from each other in the third direction,
the plurality of second connection patterns are spaced apart from each other in the third direction, and the plurality of first connection patterns respectively face the plurality of second connection patterns in the second direction.

13. The capacitor component of claim 12, wherein the second direction is perpendicular to the first direction, and the third direction is perpendicular to the first and second directions.

14. The capacitor component of claim 12, wherein W<L, where W is a length of the body in the second direction and L is a length of the body in the third direction.

15. The capacitor component of claim 12, wherein the first and second extended patterns extend on the one surface of the body to opposite ends of the body in the third direction.

16. The capacitor component of claim 12, wherein the first and second external electrodes are disposed only on the one surface of the body.

* * * * *